United States Patent
Kappauf et al.

(10) Patent No.: US 7,167,791 B2
(45) Date of Patent: Jan. 23, 2007

(54) OXYGEN DEPLETION SENSING FOR A REMOTE STARTING VEHICLE

(75) Inventors: Todd Kappauf, Dearborn, MI (US); Diana D. Brehob, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 264 days.

(21) Appl. No.: 10/951,198

(22) Filed: Sep. 27, 2004

(65) Prior Publication Data

US 2006/0068973 A1    Mar. 30, 2006

(51) Int. Cl.
*G06F 7/70*       (2006.01)
*G06F 19/00*      (2006.01)
*F02D 41/14*      (2006.01)

(52) U.S. Cl. .................. 701/104; 701/109; 123/679; 123/491

(58) Field of Classification Search .......... 123/179.2, 123/478, 480, 486, 491–494, 672, 679, 687, 123/694, 695; 701/101–105, 109, 112–115
See application file for complete search history.

(56) References Cited

U.S. PATENT DOCUMENTS

| | | | |
|---|---|---|---|
| 4,364,343 A | 12/1982 | Malik | |
| 4,453,506 A | 6/1984 | Ueda et al. | |
| 4,577,599 A | 3/1986 | Chmielewski | |
| 4,601,273 A | 7/1986 | Kitahara et al. | |
| 4,836,174 A | 6/1989 | Chujo et al. | |
| 5,220,905 A * | 6/1993 | Lundahl | 123/696 |
| 5,515,826 A * | 5/1996 | Hamburg et al. | 123/672 |
| 5,558,075 A * | 9/1996 | Maki et al. | 123/680 |
| 5,648,601 A * | 7/1997 | Katoh et al. | 73/1.06 |
| 5,656,765 A | 8/1997 | Gray | |
| 5,777,204 A | 7/1998 | Abe | |
| 5,819,714 A * | 10/1998 | Bush et al. | 701/104 |
| 5,915,368 A * | 6/1999 | Ishida et al. | 701/109 |
| 6,116,227 A * | 9/2000 | Yoshioka et al. | 701/109 |
| 6,253,542 B1 | 7/2001 | Omara et al. | |
| 6,543,431 B1 | 4/2003 | Surnilla et al. | |
| 2003/0187567 A1* | 10/2003 | Sulatisky et al. | 701/104 |

* cited by examiner

*Primary Examiner*—Willis R. Wolfe, Jr.
(74) *Attorney, Agent, or Firm*—Diana D. Brehob

(57) ABSTRACT

Automotive vehicles are increasingly being equipped with remote starting devices. If the vehicle is within a space which is very well sealed, it is possible that the concentration of the exhaust gases may exceed desirable levels. A method and system are disclosed in which a mass-based determination of air/fuel ratio is compared with the air/fuel ratio being maintained by the exhaust gas oxygen sensor. When the air/fuel ratio based on a mass measurement deviates from the air/fuel ratio based on the exhaust gas oxygen sensor by more than a threshold difference, the remotely started vehicle is turned off.

23 Claims, 5 Drawing Sheets

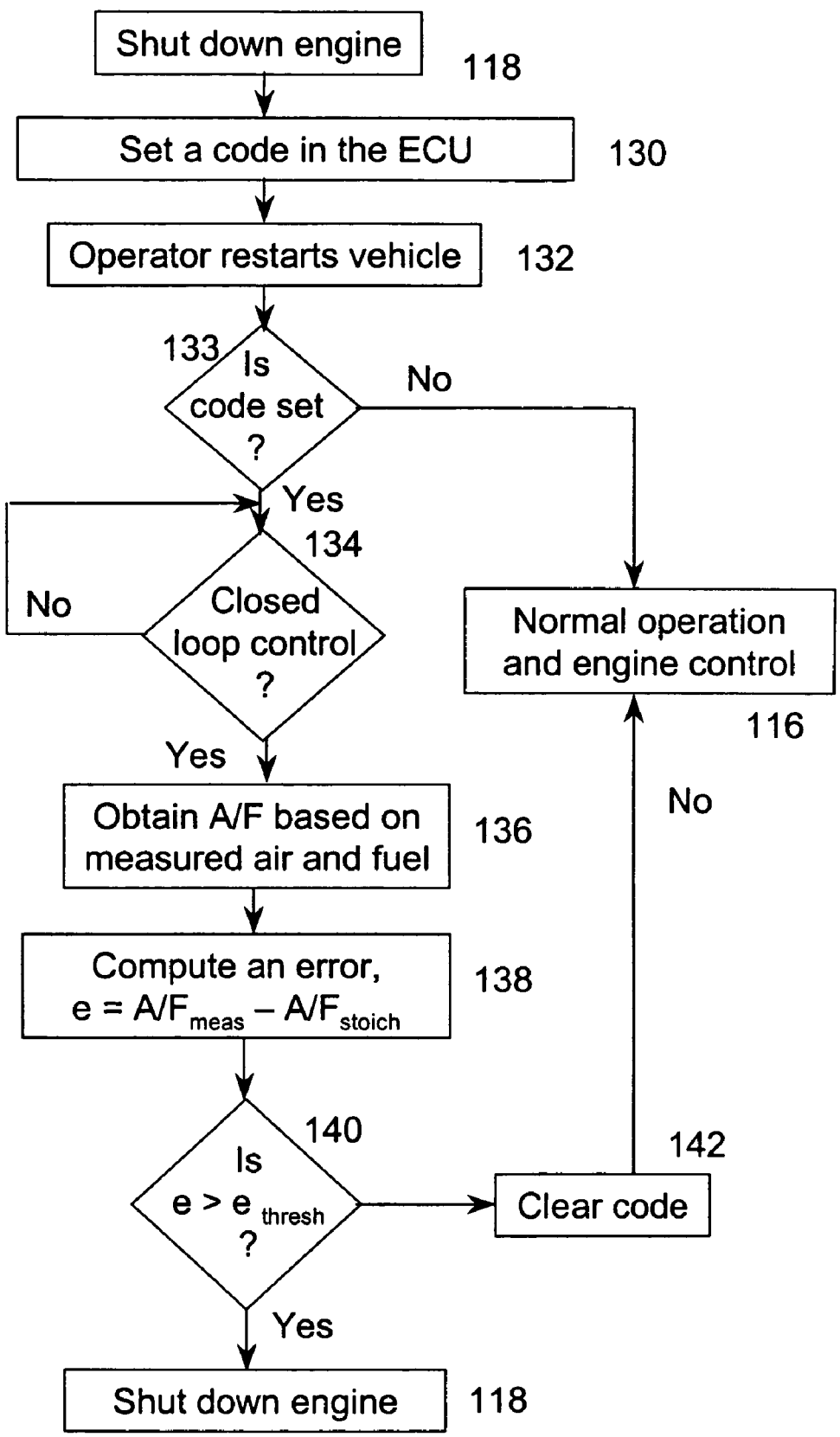

OXYGEN DEPLETION SENSING FOR A REMOTE STARTING VEHICLE

BACKGROUND OF THE INVENTION

Operators of automobiles are increasingly interested in having a remote starting feature on their vehicles in which the operator has an actuator, which when actuated, causes the engine to be started. Operators find this feature desirable, particularly in cold weather conditions, so that the engine and vehicle cabin are heated prior to the operator entering the vehicle cabin.

At the time of remote starting, the vehicle may be housed in a garage or other enclosed room. Although modern vehicles emit miniscule amounts of carbon monoxide, about one-eighth of the exhaust gas is comprised of carbon dioxide. If the room in which the vehicle is stored is exceptionally well sealed, the concentration of exhaust gases, and carbon dioxide in particular, may exceed desirable levels within the room.

SUMMARY OF THE INVENTION

The inventors of the present invention have recognized that sensors onboard a production vehicle can be used to determine when the concentration of exhaust gases in the room, in which the vehicle is confined, exceeds an acceptable level. If such a situation is determined, engine operation is discontinued.

A method to control an internal combustion engine, which is adapted for remote starting, is disclosed. A measured air/fuel ratio based on fuel flow and air flow is determined. An error is computed based on the measured air/fuel ratio and stoichiometric air/fuel ratio for the particular fuel being supplied to the engine. If the error exceeds a threshold, engine operation is ceased. Engine cessation is based on the engine having been remotely started. In one embodiment, the error is computed when the engine is being operated under closed-loop control based on-a signal from the exhaust gas oxygen sensor. In one embodiment, if the engine is under operator control, the engine is allowed to continue to operate.

The inventors of the present invention have recognized that when the engine is operating under closed loop control based on a signal from the exhaust gas oxygen sensor, the air/fuel ratio based on mass air flow measurements will deviate from the stoichiometric air/fuel ratio when the air being inducted into the engine intake contains significant amount of diluent, e.g., exhaust gas. Modern electronic control units on-board vehicles have the capability of estimating both of these air/fuel ratios. By comparing these, the deviation in the two air/fuel ratios can be determined.

In the present invention, engine operation is discontinued when the error computed based on the two air/fuel ratios exceeds a threshold. By ceasing operation, the amount of exhaust gas concentration of intake gases can no longer increase; thereby, the maximum allowable concentration of exhaust gases in an enclosed space is not exceeded, an advantage of the present invention.

The above advantages, other advantages, and features of the present invention will be readily apparent from the following detailed description of the preferred embodiments when taken in connection with the accompanying drawings.

BRIEF DESCRIPTION OF THE DRAWINGS

The advantages described herein will be more fully understood by reading an example of an embodiment in which the invention is used to advantage, referred to herein as the Detailed Description, with reference to the drawings wherein:

FIG. 7 is a flowchart of an embodiment of the present invention

DETAILED DESCRIPTION

Figure 1:
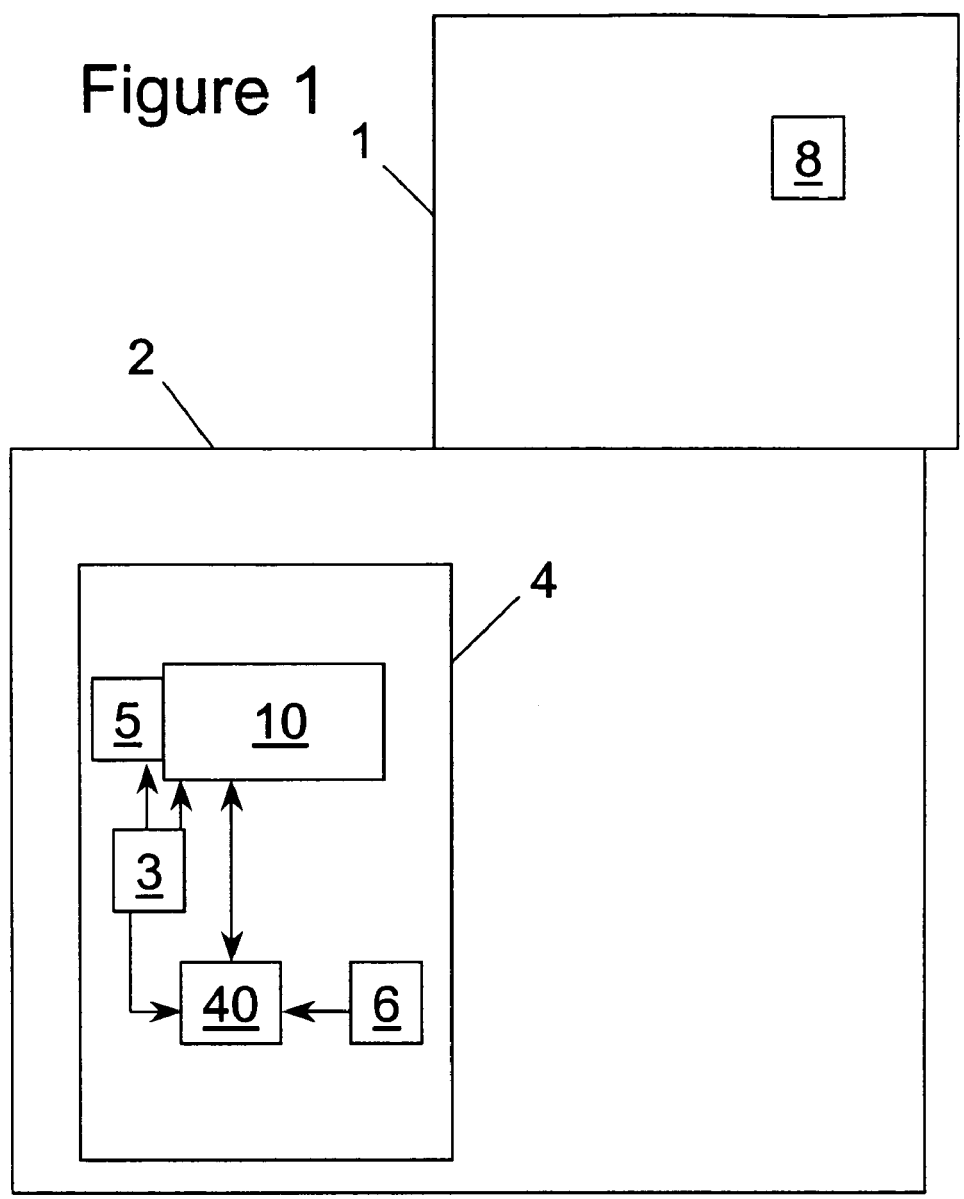
FIG. 1 is a schematic of a vehicle equipped with remote starting.

The present invention relates to a vehicle with the capability of being remotely started. In FIG. 1, a vehicle 4 is shown in an enclosure 2, which could be a garage. Vehicle 4 has an internal combustion engine 10 installed within. Engine 10 is electronically coupled to an electronic control unit 40. Enclosure 1, which could be a house, has an actuator 8. When activated, for example, by an operator of vehicle 10, actuator 8 sends a signal which is sensed by sensor 6. Sensor 6 is electronically coupled to ECU 40. When ECU 40 receives the signal that the operator has requested a start of engine 10 via actuator 8, ECU 40 starts operation of engine 10. Enclosure 1 is shown by way of example. Enclosure 1 may be detached from enclosure 2. Alternatively, actuator 8 may not be in an enclosure at all. Engine 10 is coupled to a transmission 5, which in one embodiment is an automatic transmission. Alternatively, transmission 5 is a manual transmission. Operator controls 3 are coupled to engine 10, transmission 5, and ECU 40. Operator controls include: an ignition switch, a gear shift lever, a throttle pedal, etc.

Figure 2:
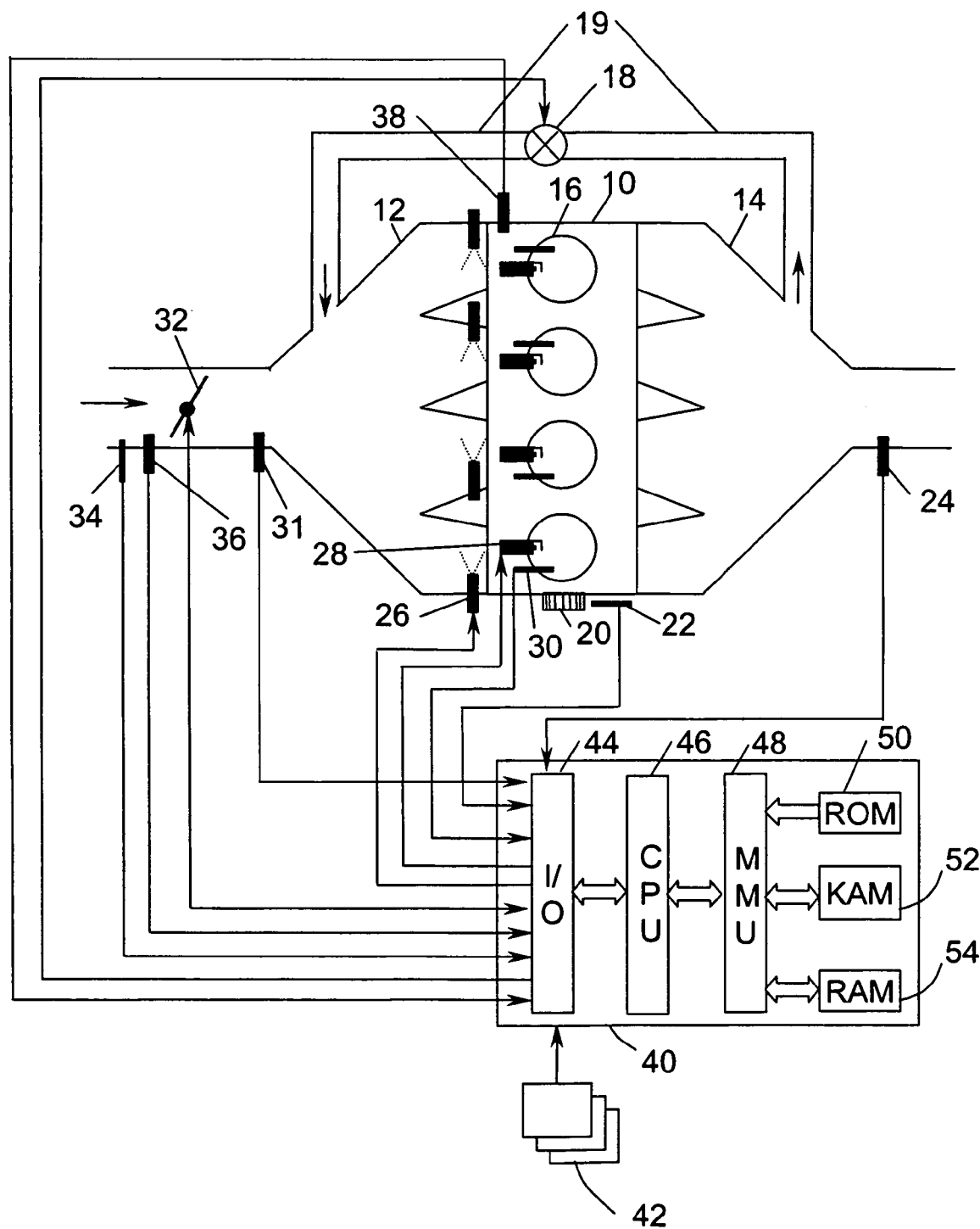
FIG. 2 is a schematic of an internal combustion engine installed in the vehicle.

A four-cylinder internal combustion engine 10 is shown, by way of example, in FIG. 2. Engine 10 is supplied air through intake manifold 12 and discharges spent gases through exhaust manifold 14. An intake duct upstream of the intake manifold 12 contains a throttle valve 32 which, when actuated, controls the amount of air flow to engine 10. Sensors 34 and 36 installed in intake manifold 12 measure air temperature and mass air flow (MAF), respectively. Sensor 31, located in intake manifold 14 downstream of throttle valve 32, is a manifold absolute pressure (MAP) sensor. A partially closed throttle valve 32 causes a pressure depression in intake manifold 12. When a pressure depression exists in intake manifold 12, exhaust gases are caused to flow through exhaust gas recirculation (EGR) duct 19, which connects exhaust manifold 14 to intake manifold 12. Within EGR duct 19 is EGR valve 18, which is actuated to control EGR flow. Fuel is supplied to engine 10 by fuel injectors 26. Each cylinder 16 of engine 10 contains a spark plug 28. A pressure transducer 30 is shown installed in each cylinder 16. The crankshaft (not shown) of engine 10 is coupled to a toothed wheel 20. Sensor 22, placed proximately to toothed wheel 20, detects engine 10 rotation. Sensor 24, in exhaust manifold 14, is an exhaust gas component sensor. Exhaust gas component sensor 24 is an exhaust gas oxygen sensor. Alternatively, exhaust gas component sensor 24 is a wide-range oxygen sensor, a nitrogen oxide sensor, a hydrocarbon sensor, or other gas component sensor as may become available.

Continuing to refer to FIG. 2, electronic control unit (ECU) 40 is provided to control engine 10. ECU 40 has a microprocessor 46, called a central processing unit (CPU), in communication with memory management unit (MMU) 48. MMU 48 controls the movement of data among the various computer readable storage media and communicates data to and from CPU 46. The computer readable storage media preferably include volatile and nonvolatile storage in read-only memory (ROM) 50, random-access memory (RAM) 54, and keep-alive memory (KAM) 52, for example. KAM 52 may be used to store various operating variables while CPU 46 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 46 in controlling the engine or vehicle into which the engine is mounted. The computer-readable storage media may also include floppy disks, CD-ROMs, hard disks, and the like. CPU 46 communicates with various sensors and actuators via an input/output (I/O) interface 44. Examples of items that are actuated under control by CPU 46, through I/O interface 44, are fuel injection timing, fuel injection rate, fuel injection duration, throttle valve 32 position, spark plug 28 timing, EGR valve 18, etc. Various other sensors 42 and specific sensors (engine speed sensor 22, cylinder pressure transducer sensor 30, engine coolant sensor 38, manifold absolute pressure sensor 31, exhaust gas component sensor 24, air temperature sensor 34, and mass air flow sensor 36) communicate input through I/O interface 44 and may indicate engine rotational speed, vehicle speed, coolant temperature, manifold pressure, pedal position, cylinder pressure, throttle valve position, air temperature, exhaust temperature, exhaust stoichiometry, exhaust component concentration, and air flow. Some ECU 40 architectures do not contain MMU 48. If no MMU 48 is employed, CPU 46 manages data and connects directly to ROM 50, RAM 54, and KAM 52. Of course, the present invention could utilize more than one CPU 46 to provide engine control and ECU 40 may contain multiple ROM 50, RAM 54, and KAM 52 coupled to MMU 48 or CPU 46 depending upon the particular application.

Figure 3:
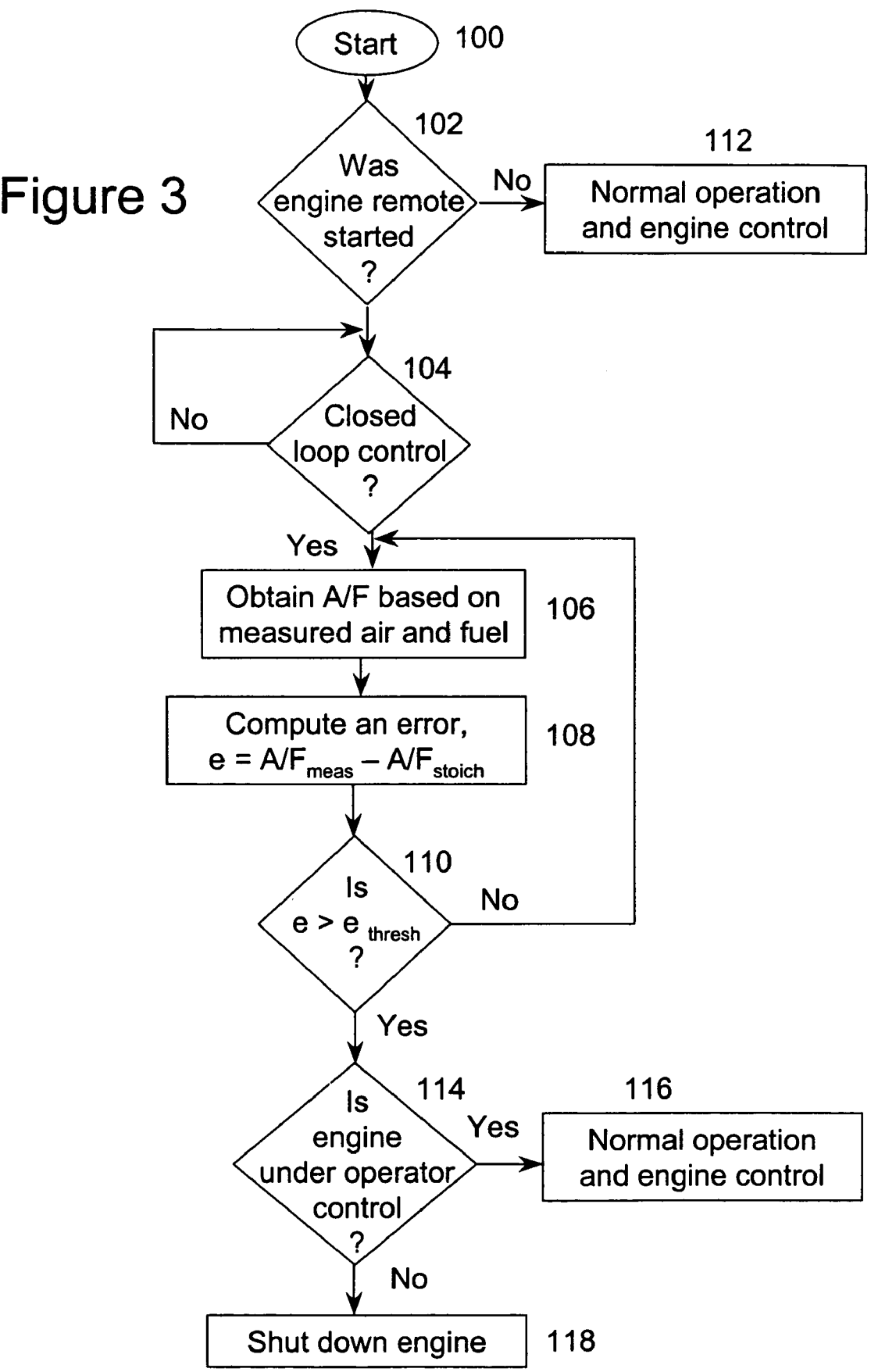
FIG. 3 is a flowchart of an embodiment of the present invention.

A flowchart showing an embodiment of the present invention is shown in FIG. 3. It is determined whether the engine was remotely started in block 102. If not, the normal engine control algorithms, which are outside the present invention, are followed. If the engine was remotely started, control passes to block 104 in which it is determined whether the engine is operating in a closed-loop control mode. Closed-loop control will be discussed in more detail below. Briefly, the exhaust gas oxygen sensor, which forms the basis for closed-loop control, provides a reliable signal only when sufficiently warm. Closed-loop control is delayed until such a reliable signal is obtain. When closed-loop control is determined in block 104, control passes to block 106 in which an air/fuel ratio based on measurements of air flow and fuel flow is computed. Control passes to block 108 in which an error is computed: measured air/fuel ratio minus stoichiometric air/fuel ratio, the latter discussed in more detail below. In block 110, it is determined whether the error exceeds a threshold. If not, control is passed back to block 106 for continuous monitoring. If a positive result from block 110 is obtained, control passes to block 114 in which it is determined whether the engine is under operator control. If so, normal operation, according to control algorithms outside the present invention, is accessed in block 116. If the operator has taken over control, it is likely that the operator is about to remove the vehicle from an enclosure thereby taking mitigating action to overcome the issue of the two air/fuel ratios deviating from each other. In an alternative embodiment, blocks 114 and 116 are not included. In this alternative embodiment, a positive result from block 110 feeds into block 118, in which the engine is shut down.

Figure 4:
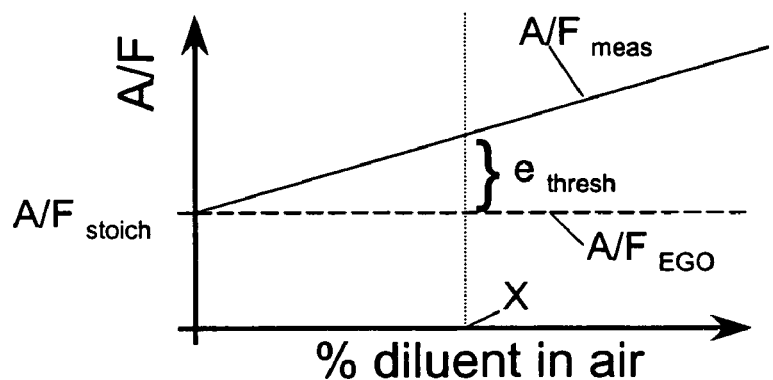
FIG. 4 is a graph showing how air/fuel ratio is affected by the percent diluent in the inducted air.

In block 114 of FIG. 4, it is determined if the engine is under operator control. In this context, this means has the operator taking over control beyond the initial starting of the engine remotely. Determination of taking over control is based on one of: inserting the key into the ignition, turning the key in the ignition switch, opening the door of the vehicle, moving a gear shift lever, depressing the clutch, as examples.

Modern engines use a catalytic converter to oxidize unburned hydrocarbons and carbon monoxide to water and carbon dioxide and to reduce nitrogen oxides to nitrogen and oxygen. The catalytic converter operates with a high efficiency at carrying out these reactions when it is fed gases at a stoichiometric air/fuel ratio, i.e., the air and fuel fed to the engine are in such a proportion that all of the air and fuel could theoretically react to produce only carbon dioxide, water, and unreacted nitrogen from the air. EGO sensor 24 provides a low voltage when the gases it contacts are lean of stoichiometric and a high voltage when the gases are rich of stoichiometric. By biasing the air/fuel mixture very slightly rich and then very slightly lean, the average air/fuel ratio can be maintained very close to stoichiometric with adjustments to the air/fuel ratio being feedback controlled on EGO sensor 24 signal. Such closed-loop control is used in nearly all production engines and is well known by those skilled in the art.

If vehicle 4 is within a poorly ventilated enclosure 2, it is possible that the air being inducted into engine 10 becomes substantively diluted. If the inducted air is diluted, more air is required to provide the amount of oxygen needed to provide a stoichiometric mixture. Commonly, during engine idle, the amount of air supplied to the engine is controlled to maintain a desired engine idle speed. Thus, if the air being inducted into the engine does not provide enough oxygen to burn the fuel, the fueling rate would drop slightly causing engine speed to drop. To maintain engine speed, throttle 32 would be caused to open slightly to induct more air. Alternatively, an idle air bypass valve (not shown) would be opened further to supply more air to engine 10. Under this feedback strategy where air is controlled to maintain engine speed and fuel is controlled to maintain stoichiometric conditions in the exhaust, EGO sensor 24 would continue to indicate that the engine is operating at stoichiometric air/fuel ratio, regardless of the amount of exhaust gas dilution. Stoichiometric air/fuel ratio for gasoline is about 14.6 on a mass basis. A measure of the mass of air and the mass of fuel being supplied to the engine would indicate that the mass of air had increased when there is diluent in the air, thus causing the air/fuel ratio based on such a measurement to increase.

Referring now to FIG. 4, percent diluent in the induction air (x-axis) is plotted versus air/fuel (y-axis). X % on the x-axis signifies the maximum acceptable diluent fraction.

The air/fuel from the EGO sensor is a constant regardless of the amount of diluent. Furthermore, that constant is the stoichiometric air/fuel. The EGO sensor signal is employed in practice to ensure that a stoichiometric amount of air and fuel is supplied to the engine. The EGO sensor has no way of determining that the air is diluted with exhaust gases necessitating a higher mass of the diluted air to be delivered to the engine to provide the same power. Thus, the dashed line in FIG. 4 signifies the constant air/fuel because of feedback control on the EGO sensor. A solid line in FIG. 4 indicates how the air/fuel based on measurement of air and fuel flow increases when the amount of diluent in the air increases. At X % diluent, the deviation in the two air/fuel ratios is shown as $e_{thresh}$, the threshold error. Error, e, is defined as: $e = A/F_{meas} - A/F_{stoich}$. As discussed above, the engine is to be shut off when e exceeds $e_{thresh}$, which indicates that the amount of diluent in the inducted air is greater than X %, the maximum acceptable level of diluent.

Continuing to refer to FIG. 4, the $A/F_{stoich}$ is the stoichiometric air/fuel, which as discussed above, is 14.6 for gasoline. The stoichiometric air/fuel is other than 14.6 for alternative fuels such as hydrogen, natural gas, liquid petroleum gas, biofuels, alcohols, etc. Either stoichiometric air/fuel is a known quantity, or in the case of gasohols, which could have various percentages of alcohol in gasoline, it is known to use a sensor in the fuel tank or other estimating means to determine the percent of alcohol in the fuel, thereby allowing the computation of the stoichiometric air/fuel.

Typically fuel flow is measured based on the pressure in the fuel injection system and the fuel pulse width, that is, the time that the fuel injector is open. This example is given for illustration purposes only and not intended to be limiting to the present invention. There are two common methods by which mass airflow is measured on production vehicles. These are known by those skilled in the art as speed-density and MAF, for mass-air flow. The former method relies on a measure of the pressure in the intake manifold downstream of throttle 32 and an engine speed sensor 22. Additionally, the volume of air inducted into engine cylinders each intake event must be known. The mass of air inducted into the engine is computed therefrom. Alternatively, a mass flow sensor 36 is placed upstream of throttle 32 providing the desired quantity directly.

After engine 10 has been shut down due to a deviation in the two air/fuel ratios, the operator of the vehicle may desire to restart the engine and drive the vehicle away. In one embodiment of the present invention, the engine remains disabled for a period of time before restart is allowed. This period of time is based on the time history of the measured air/fuel ratio. That is, if the measured air/fuel ratio rises rapidly, it indicates that vehicle 4 is in a very small and/or very well sealed enclosure 2. It is likely to take longer, in this situation, for the air in enclosure 2 to be refreshed such that it has significantly less than the acceptable concentration of diluent. Conversely, if the measured air/fuel ratio very slowly rises, indicating that diluent concentration is slowly increasing in the air in enclosure 2, the time until restart is shorter than the former scenario.

Figure 5:
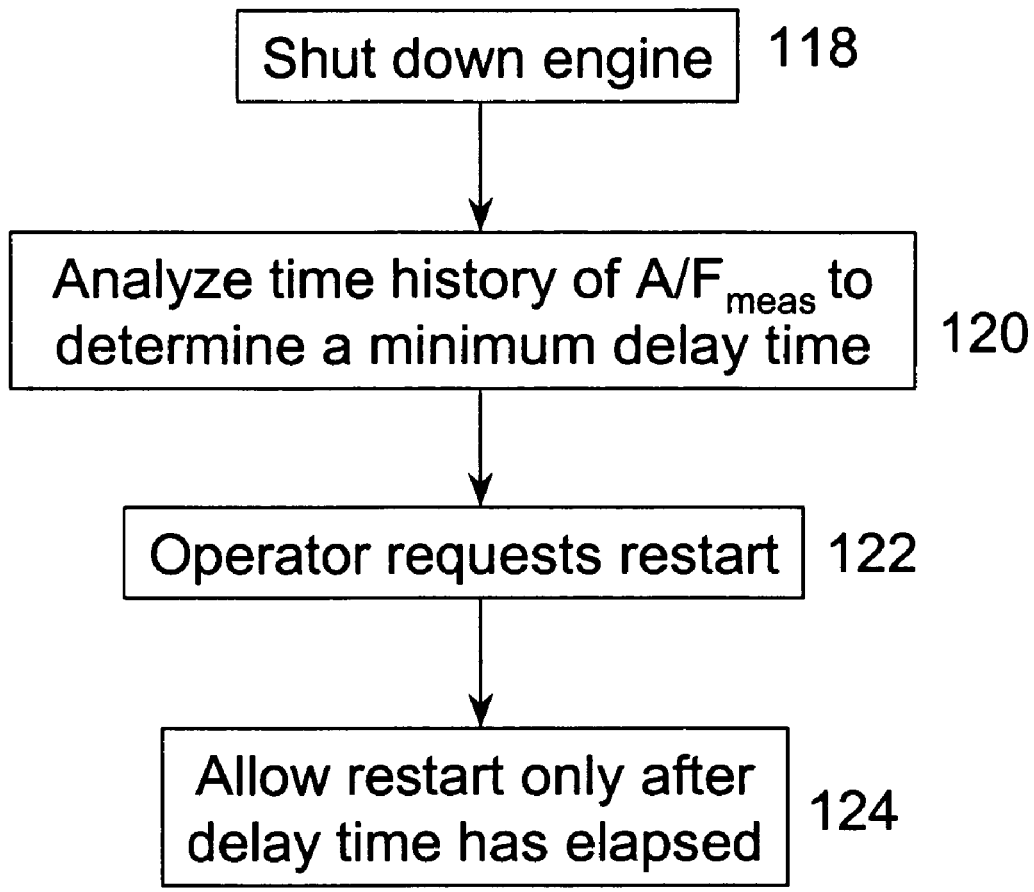
FIG. 5 is a flowchart of an embodiment by which engine restart is achieved following an engine shutdown.

Referring to FIG. 5, after engine 10 has been shut down (block 118 as shown in both FIGS. 3 and 5), control is passed to block 120 in which the time history of the measured air/fuel is analyzed to determine an appropriate delay time. Control then passes to block 122, in which ECU 40 waits for an operator request for a restart. In block 124, the actual time delay since engine 10 was shutdown is compared with the minimum delay time computed in block 120. If the actual delay time exceeds the minimum delay time, a restart is allowed. Otherwise, engine 10 is maintained in the shutdown condition until such minimum delay time has passed.

Figure 6:
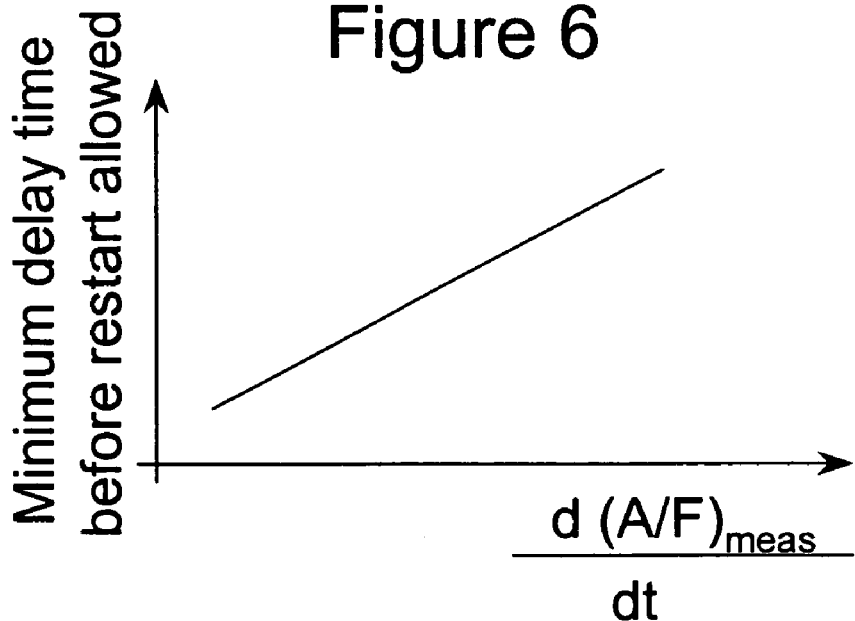
FIG. 6 is a graph of the minimum delay time as a function of the time rate of change of measured air/fuel ratio according to an aspect of the invention.

Referring now to FIG. 6, one example of how minimum delay time could be computed is provided. In block 120 of FIG. 5, $A/F_{meas}$ is analyzed. In the particular example of FIG. 6, the time rate of change of $A/F_{meas}$ is determined. If the slope of $A/F_{meas}$ is high, this indicates a small or well sealed enclosure 2 and that it is likely to take longer for the air in enclosure 2 to return to a concentration of exhausts gases less than the acceptable dilution amount. Thus, the minimum delay time is greater.

Referring now to FIG. 7, an alternative embodiment is employed for engine restart. Starting with block 118, the engine is shut down. Control passes to block 130 in which a code in ECU 40 is set indicating that the engine was shut down due to a problem with excess exhaust gas dilution in the air. The operator restarts in block 132. In block 133, it is determined whether the code was set in block 130. If not, control passes to block 116, normal operation. If the code was set, control passes to block 134 in which an algorithm similar to that in FIG. 3 is followed. That is, the measured air/fuel is determined in block 136; the difference between measured and stoichiometric air/fuel is computed in block 138; and the difference is compared to a threshold error in block 140. If greater than the threshold error, control passes to block 118 to shut down the engine. If less than the threshold error, control passes to block 142 to clear the error code and resume normal operation in block 116.

While several modes for carrying out the invention have been described in detail, those familiar with the art to which this invention relates will recognize alternative designs and embodiments for practicing the invention. The above-described embodiments are intended to be illustrative of the invention, which may be modified within the scope of the following claims.

We claim:

1. A method to control an internal combustion engine, the engine being adapted for remote starting, comprising:
   determining a measured air/fuel ratio based on fuel flow and air flow, said fuel flow and said air flow being supplied to the engine;
   computing an error based on said first air/fuel ratio and a stoichiometric air/fuel ratio; and
   ceasing engine combustion when said error exceeds a threshold and when it is determined that the engine has been started remotely.

2. The method of claim 1 wherein said error is computed as said measured air/fuel ratio minus said stoichiometric air/fuel ratio.

3. The method of claim 1, further comprising: allowing said engine combustion to continue when the engine is under operator control.

4. The method of claim 1, further comprising: determining whether the engine is under operator control wherein said ceasing of engine combustion occurs based on whether the engine is under other than operator control.

5. The method of claim 1 wherein said combustion cessation comprises shutting off fuel injectors, said fuel injectors being coupled to the internal combustion engine.

6. The method of claim 1 wherein the engine is installed in a vehicle and said remote starting comprises:
   an operator-activated actuator adapted to send a start signal in response to an operator command for said remote start; and
   a sensor coupled to said vehicle which is adapted to accept said start signal from said operator-activated actuator.

7. The method of claim 1, further comprising:
determining that the engine is being operated in a closed-loop, air/fuel ratio control mode, said mode being based on a signal from an exhaust gas oxygen sensor, said exhaust gas oxygen sensor being coupled to an engine exhaust;
initiating said error computation based on said engine operation being in closed-loop mode.

8. The method of claim 1 wherein said stoichiometric air/fuel ratio is based on fuel being used in the engine.

9. The method of claim 1 wherein said stoichiometric air/fuel ratio is 14.6 when gasoline is being supplied to the engine.

10. The method of claim 1 wherein said measured air/fuel ratio is determined from a fuel pulse width commanded to fuel injectors coupled to said engine and a determined mass air flow delivered to said engine.

11. The method of claim 2 wherein said mass air flow is based on a signal from a mass air flow sensor coupled to an engine intake.

12. The method of claim 2 wherein said mass air flow is based on engine rpm and intake manifold absolute pressure, said intake manifold being coupled to the internal combustion engine.

13. A method to control an internal combustion engine installed into a vehicle, the engine being adapted for remote starting, comprising:
determining a measured air/fuel ratio based on fuel flow and air flow to the engine;
computing an error based on said first air/fuel ratio and a stoichiometric air/fuel ratio; and
ceasing engine combustion when said error exceeds a threshold.

14. The method of claim 13 wherein said engine combustion cessation occurs only when an operator of the vehicle has not intervened.

15. The method of claim 13 wherein said operator intervention comprises at least one of: opening a door of the vehicle, inserting a key into an ignition switch coupled to the vehicle, turning a key inserted into an ignition switch coupled to the vehicle, and moving a shift lever out of a park position, said shift lever being coupled to an automatic transmission, said automatic transmission being coupled to the engine.

16. The method of claim 13 wherein said engine combustion cessation comprises stopping fuel delivery by fuel injectors coupled to the engine.

17. The method of claim 13 wherein said threshold is based on maintaining an acceptable concentration of exhaust gases in an engine intake or less.

18. The method of claim 13 wherein said engine cessation occurs only when the engine has been remotely started.

19. The method of claim 13, further comprising:
setting a code in an engine control unit coupled to the engine when engine combustion cessation has occurred.

20. The method of claim 19, further comprising:
allowing said engine to restart upon operator request; and when said code has been set, performing:
said determining a measured air/fuel ratio based on fuel flow and air flow to the engine;
said computing an error based on said first air/fuel ratio and a stoichiometric air/fuel ratio; and
said ceasing engine combustion when said error exceeds a threshold.

21. The method of claim 13, further comprising: computing a minimum delay time before restart is allowed, said minimum delay time being based on a time history of measured air/fuel ratio prior to said engine combustion cessation.

22. The method of claim 21, further comprising:
comparing said minimum delay time with an actual delay time, said delay time being the time elapsed since engine was shutdown; and
allowing engine restart when said actual delay exceeds said minimum delay.

23. The method of claim 21, wherein said minimum delay time is based on a time rate of change of said measured air/fuel ratio prior to said engine cessation.

* * * * *